United States Patent [19]

Azuma

[11] 3,916,100

[45] Oct. 28, 1975

[54] APPARATUS FOR SENDING-OUT HANDWRITTEN PATTERN INFORMATION

[75] Inventor: Nobuhiro Azuma, Tokyo, Japan

[73] Assignee: Kokusai Denshin Denwa Kabushiki Kaisha, Japan

[22] Filed: Feb. 26, 1974

[21] Appl. No.: 445,858

[30] Foreign Application Priority Data

Feb. 28, 1973 Japan ................................ 48-23248

[52] U.S. Cl. ............................ 178/18; 340/347 AD

[51] Int. Cl...... G08c 21/00; H04l 3/00; H03k 13/00

[58] Field of Search............ 178/18, 19, 20; 33/1 M; 340/146.3 AE, 347 AD

[56] References Cited

UNITED STATES PATENTS

| | | | |
|---|---|---|---|
| 2,682,045 | 6/1954 | Crost | 178/19 |
| 2,889,627 | 6/1959 | Culpepper et al. | 178/18 |
| 3,500,379 | 3/1970 | Gibbons et al. | 33/1 M |
| 3,838,211 | 9/1974 | Joannou | 178/18 |

*Primary Examiner*—Thomas A. Robinson
*Attorney, Agent, or Firm*—Robert E. Burns; Emmanuel J. Lobato; Bruce L. Adams

[57] ABSTRACT

An apparatus for sending-out orthogonal coordinate signals of a handwritten pattern, in which a handwriting pen is supported by an arm having a variable length with respect to a reference position. The arm is supported by a supporting frame at the reference position to turn with respect to the reference position. The substantial length of the arm from the reference position to the handwriting position is converted to one of the orthogonal coordinate signals. A rotation angle of the arm with reference to a reference line passing through the reference position is converted to the other of the orthogonal coordinate signals. The orthogonal coordinate signals are simultaneously produced with the handwriting operation of the handwritten pattern.

5 Claims, 4 Drawing Figures

APPARATUS FOR SENDING-OUT HANDWRITTEN PATTERN INFORMATION

This invention relates to apparatus for sending-out pattern information indicative to characters, figures or the like and, more particularly, to handwritten pattern information transmitting apparatus for simultaneously obtaining coordinate signals from handwritten characters, figures or the like.

To obtain pattern information of handwritten characters, figures or the like in the form of coordinate signals, there have been heretofore adopted different systems. In one of the systems, a matrix mesh using a plurality of parallel column conductors and a plurality of parallel row conductors intersecting one another is arranged in a handwriting-board to flow currents through the mesh, so that the position of the tip of the handwriting pen is detected in response to the electrical induction caused between the mesh and the tip of the pen. In another of the systems, microphones are provided in association with the X-Y coordinates, so that the propagation times of sound waves from the tip of the pen to the respective coordinates are measured. However, the former is expensive and limited in resolution, and the latter utilizes spark discharge for producing a sound source and hence is dangerous and impracticable at a place of inflammable vapor.

An object of this invention is to provide an apparatus for transmitting handwritten digital position information with respect to orthogonal coordinates, which is free from the above-mentioned defects experienced in the prior arts, and which is inexpensive, readily fabricatable and excellent in resolution.

The principle, construction and operation of this invention will be clearly understood from the following detailed description taken in conjunction with the accompanying drawings, in which.

Figure 1:
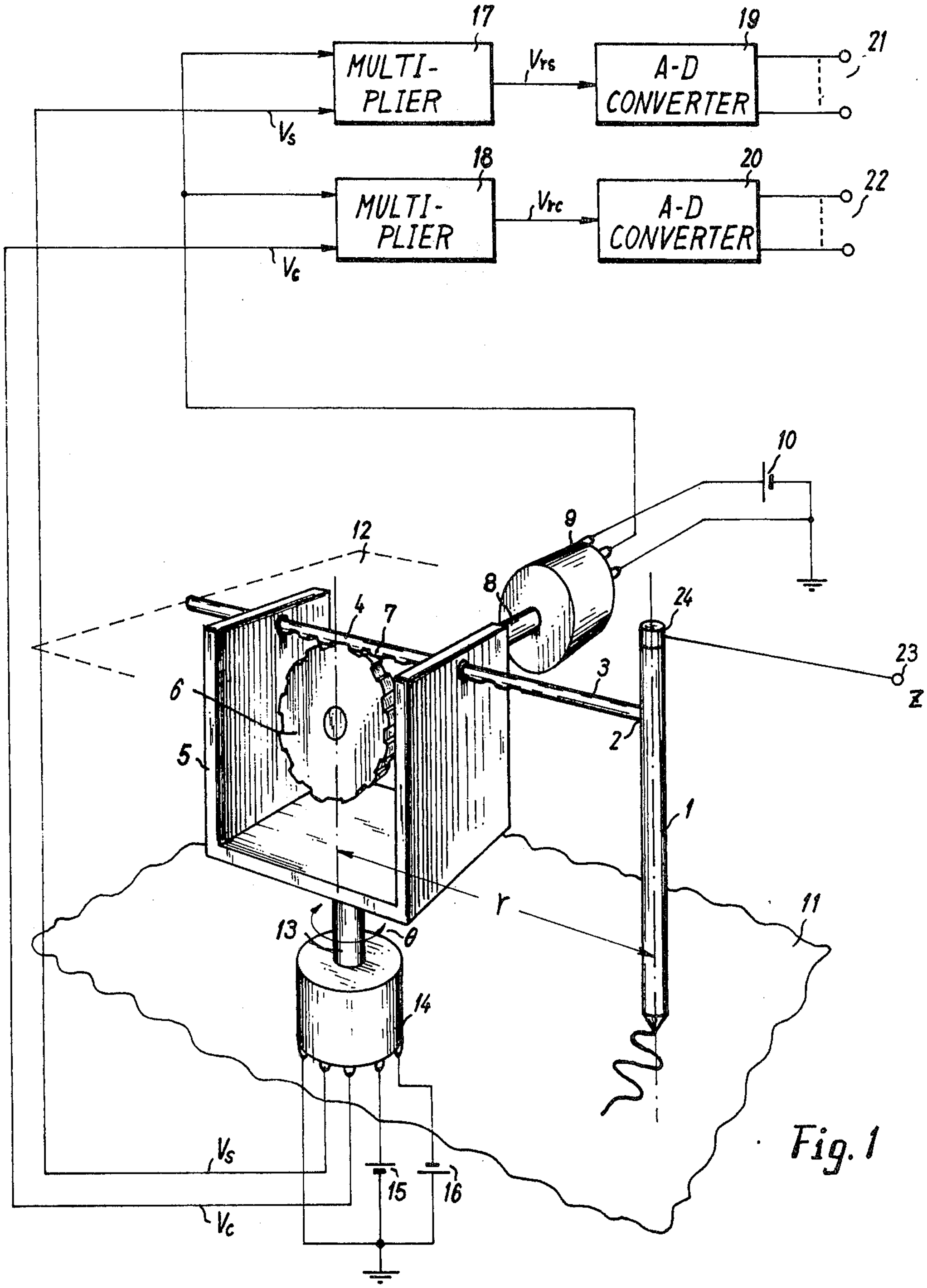
FIG. 1 is a connection diagram including a schematic view illustrating an embodiment of this invention.
Figure 2:
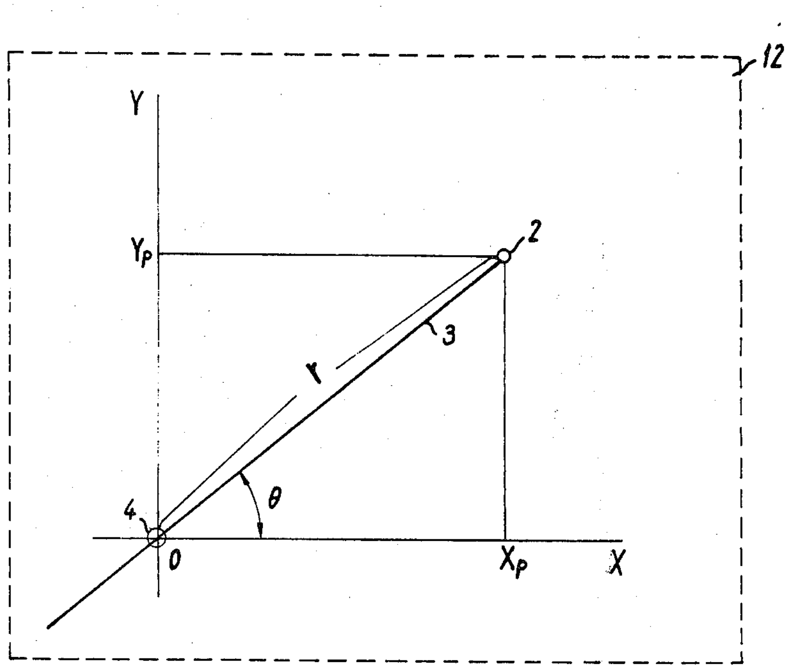
FIG. 2 is a graph explanatory of the operation of this inveniton.
Figure 3:
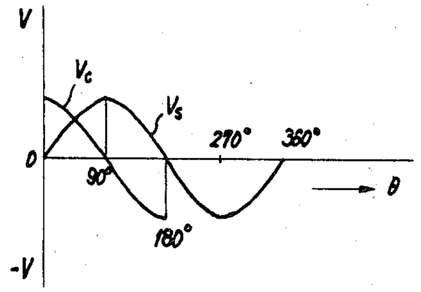
FIG. 3 is a wave form diagram explanatory of the operation of this invention.

With reference to FIG. 1, a writing member or pointer 1 such as a ball pen is supported by a supporting arm 3 at its support position 2. The arm 3 is supported, for example, through a linear bearing by a support frame 5 in such a manner that an arm length $r$ between the support position 2 and a reference point 4 provided along the arm 3 is variable. A rack 7 formed on the arm 3 meshes with a pinion gear 6 supported by the support frame 5. A shaft 8 of the pinion gear 6 is coupled with a shaft of potentiometer 9. The potentiometer 9 is connected to battery 10 and produces a length $r$ signal $V_r$ indicative of the length of the arm 3 from the reference point 4. Accordingly, the rack 7 on the arm 3, the pinion gear 6, the shaft 8, the potentiometer and the battery 10 make up a first transducer for length-voltage conversion. The support frame 5 is supported on a support shaft 13 in such a manner that the arm 3 is allowed to turn about the reference point 4 in a rotational plane 12 parallel with a reference plane 11. 11. The support shaft 13 is coupled with the shaft of a potentiometer 14. The potentiometer 14 is connected to batteries 15 and 16 to produce a sine signal $V_s$ and a cosine signal $V_c$, which are respectively indicative of the sine signal sin Θ and the cosine signal cos Θ of a rotation angle Θ of the arm 3 with reference to a predetermined reference line (e.g.; the abscissa (x)) passing through the reference 4 in the rotational plane 12 of the arm 3 as shown in FIGS. 2 and 3. Accordingly, the gear 6, the support frame 5, the support shaft 13, the potentiometer 14 and the batteries 15 and 16 make up a second transducer for converting the aforementioned rotational angle Θ into the sine signal sin Θ and the cosine signal cos Θ corresponding thereto. A multiplier 17 produces a signal $V_{rs}$ (i.e. a Y-component $Y_p$ in FIG. 2) corresponding to the product of the length signal $V_r$ and the sine signal $V_s$, while a multiplier 18 produces a signal $V_{rc}$ corresponding to the product of the length signal $V_r$ and the cosine signal $V_c$. A-D coverters 19 and 20 convert the signals $V_{rs}$ and $V_{rc}$ into digital code units respectively which are obtained, for example, as Y-code units respectively which are obtained, for example, as Y-coordinates data and X-coordinate data at output terminals 21 and 22 respectively. At an output terminal 23, there is obtained a Z-coordinate signal indicative of the up-down position of the writing member 1, which is detected by a detecting element 24 such as a microswitch or a pressure-sensitive element.

In the above arrangement, if the tip of the writing member 1 is moved along a handwritten pattern on the reference plane 11, the X-Y coordinate signals can be simultaneously obtained with the handwriting operation as shown in FIG. 2 and then can be applied, for example, to a digital electronic computer. The Z-coordinate signal is employed as control signal for other devices, if necessary.

In a case where the outputs are to be obtained in the form of analogue signals, the outputs $V_{rs}$ and $V_{rc}$ from the multipliers 17 and 18 can be applied, as they are, to an X-Y plotter by way of example.

The aforesaid potentiometer 14 is preferred to be of the trigonometric function type in which the resistance value varies in proportion to the sine sin Θ and the cosine cos Θ of the rotational angle Θ.

Although the foregoing description has been given with regard to the case where the angle Θ of the arm 3 relating to the abscissa (X) is employed, it can be readily analogized that this invention can be similarly applied in connection with a case where the angle of the arm relating to the ordinate (Y) is employed.

Further, this invention has been described in connection with the first quadrant, but it is a matter of course that this invention can be practised in other quadrants.

Figure 4:
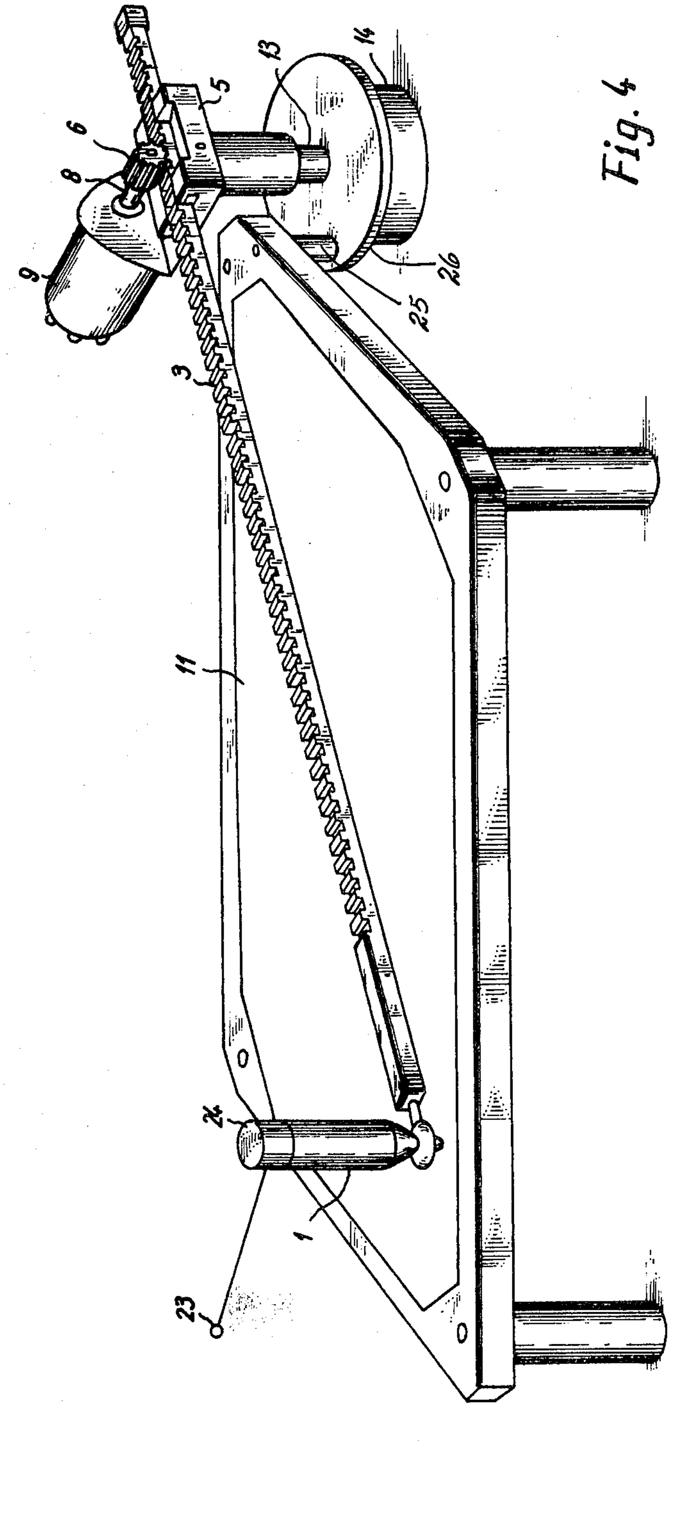
FIG. 4 is a schematic view of an actual embodiment of this invention.

FIG. 4 shows an acutal embodiment of this invention, in which the same parts as those shown in FIG. 1 are designated by the same reference numerals. In this embodiment, a table corresponding to the reference plane 11 is supported at four corners thereof by four supporting members. On of the four supporting members comprises a short leg 25 to support a corner of the table on a circular plate 26 fixed on the potentiometer 14. The lower end of the potentiometer 14 has the same level as those of other three supporting members. The shaft 13 of the potentiomeer 14 is coupled to the supporting frame 5 by a pin, so that the arm 3 can be raised and lowered with respect to the shaft 13. Other aspects of its construction and operations will be understood from the description with reference to FIG. 1, details being omitted.

As has been described in the foregoing, the handwritten pattern information transmitting apparatus of this invention is easy to fabricate, inexpensive, capable of transmitting highly accurate handwritten pattern information and, further, advantageous in that a substitute for a keyboard can be realized at low cost by providing a dial plate indicating a desired number of characters or symbols on a tablet.

What I claim is:

1. A pattern information transmitting apparatus, comprising:

a sine/cosine servo potentiometer having a shaft defining a reference axis;

a supporting frame mounted on said shaft to turn therewith;

a pinion gear rotatably mounted on said supporting frame, an arm having a rack portion extending along a portion of the length of said arm, said supporting frame having mounting means for slidably mounting said arm to orthogonally intersect said reference axis and with said rack portion engaging said pinion gear to rotate said pinion gear as said arm is displaced in a longitudinal direction thereof;

a second potentiometer cooperative with said pinion gear to change resistance in proportion to the angular displacement of said pinion gear;

a pointer mounted at an end of said arm remote from said supporting frame to facilitate positioning of the remote end of said arm radially and angularly about said referenc axis to define a pattern in a reference plane;

means for applying direct current to said potentiometers to develop direct current sine, cosine and distance output signals representative of the sine and cosine of the angular position of the remote end of said arm from said reference axis and the distance of the remote end of said arm from said reference axis, respectively;

a first multiplier circuit receptive of said sine output signal and said distance output signal for developing a signal proportional to the product of said sine and distance output signals; and a second multiplier circuit receptive of said cosine output signal and said distance output signal for developing a signal proportional to the produce of said cosine and distance output signals.

2. A pattern information transmitting apparatus according to claim 1 further comprising, a table for defining a reference plane; and a plurality of supporting members extending from said table wherein one of said supporting members comprises said sine/cosine servo potentiometer whereby said reference axis is maintained at a fixed position relative to said table.

3. A pattern information transmitting apparatus according to claim 1 further comprising, a pair of analog-to-digital converters, each receptive of the output signal from a respective one of said multiplier circuits, for converting the multiplier output signals to digital signals.

4. A pattern information transmitting apparatus according to claim 1 further comprising, direct current voltage sources connected to said means for applying direct current to said potentiometers.

5. A pattern information transmitting apparatus according to claim 1, wherein said pointer comprises means for writing.

* * * * *